H. R. EUBANK.
SHOCK HANDLING DEVICE.
APPLICATION FILED FEB. 6, 1917.

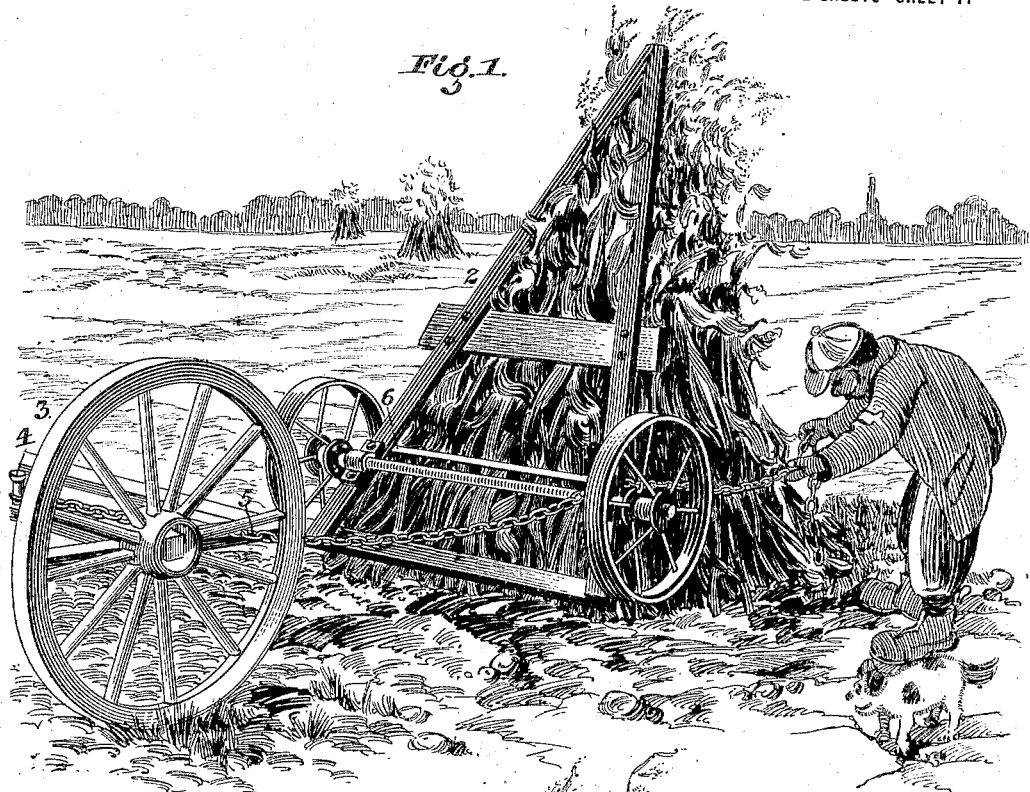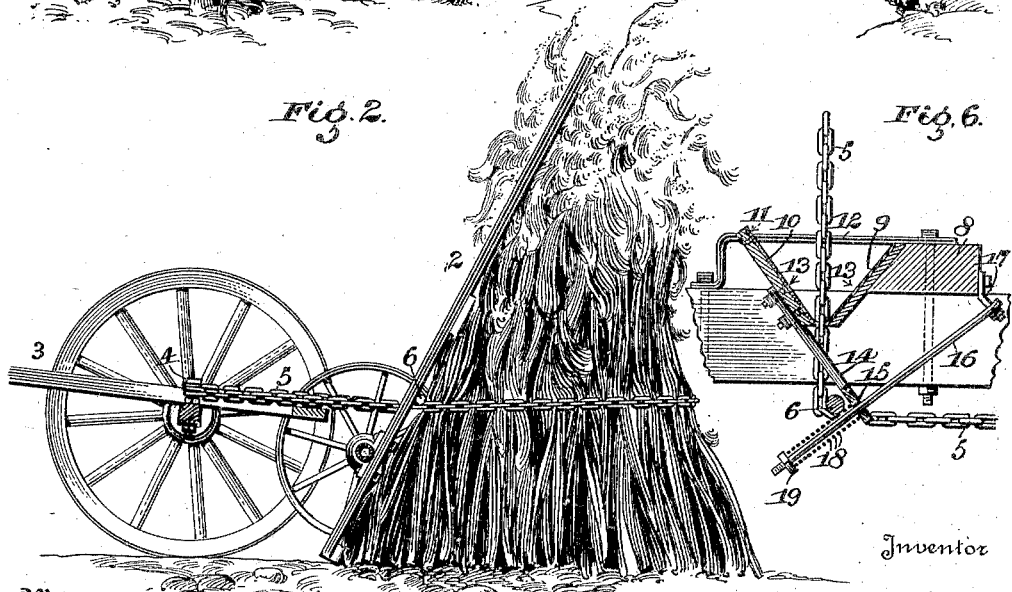

1,249,935.

Patented Dec. 11, 1917.

Inventor
H. Ragland Eubank
By William T. Jones
Attorney

UNITED STATES PATENT OFFICE.

HENRY RAGLAND EUBANK, OF ETNA MILLS, VIRGINIA.

SHOCK-HANDLING DEVICE.

1,249,935.      Specification of Letters Patent.     Patented Dec. 11, 1917.

Application filed February 6, 1917. Serial No. 146,952.

*To all whom it may concern:*

Be it known that I, HENRY RAGLAND EUBANK, a citizen of the United States, residing at Etna Mills, in the county of King William and State of Virginia, have invented certain new and useful Improvements in Shock-Handling Devices, of which the following is a specification, reference being had therein to the accompanying drawings.

My invention relates to a shock-handling device, and the objects thereof are to provide for the elimination of the old and generally prevalent practice of handling a shock, armful by armful; to provide for transferring the shock from the ground to the device in a substantially compact mass so that very little, if any, of the shock remains on the ground; to provide a device which is extremely simple in construction and operation; and finally to provide a device which will expedite, in a generic sense, the transportation of a shock from a field to any desirable point.

My invention will be best understood in connection with the accompanying drawings which, merely for the purposes of illustration, show the particular form of the invention which I at this time regard as preferable of the various forms in which my invention may be embodied.

In said drawings:

Figure 1 is a perspective view of the invention in position to have a shock lashed thereto.

Fig. 2 is a side elevation, partly in section, of the device showing the shock lashed thereto, and ready to be tilted.

Fig. 6 is a detail sectional view of the same.

Figure 3:
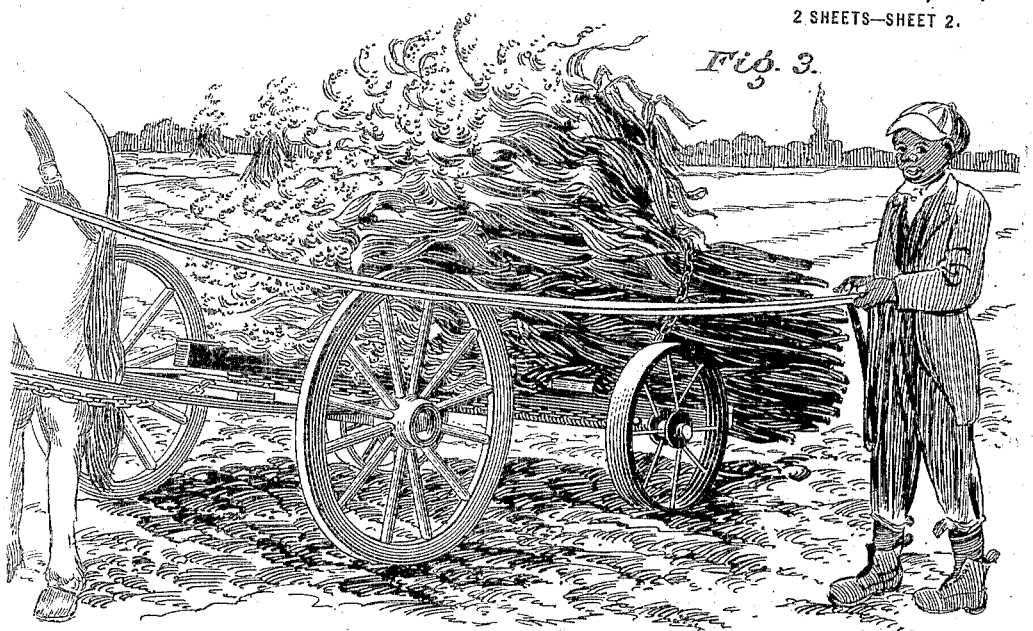
Fig. 3 is a perspective view of the invention illustrating the shock in its final position.
Figure 4:
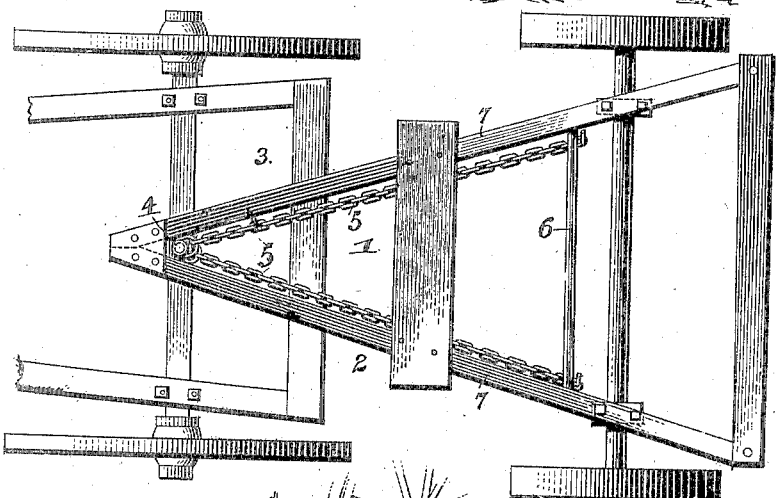
Fig. 4 is a top plan view of the invention.

Generally speaking my invention comprises a vehicle running gear formed of two separable sections, one serving as a shock-receiving element and the other as a draft element. The two sections are adapted to be held together by means of what may be termed a main guiding connection and an auxiliary shock-lashing connection, the idea being that the shock-receiving element, while in substantial vertical position, has the shock loosely bound thereto by means of a flexible connection which is permanently carried by the draft element, and that simultaneously with the pull exerted on the draft element, the shock-receiving element with the shock is rocked through the medium of the force communicated by the flexible connection, whereby the said shock-receiving element is brought to rest on the draft element and the tension of the flexible connection automatically increased and tightened about the shock as the vehicle progresses. I have also devised means which will take care of any slack which occurs in the flexible connection, thereby positively preventing displacement of the load.

Referring specifically to the drawings, the numeral 1 designates broadly the vehicle running gear, consisting of a shock-receiving or shock-supporting frame 2, and a draft element 3, the former being preferably constructed in substantially triangular form, and the latter being of any desired conventional type. The two sections are adapted to be connected together by two separate and distinct means, one, the connection between the forward end of the frame 2 and the vertical pin 4, and the other constituted by a chain 5, or equivalent flexible connection, between the shock, and said pin 4. This chain extends rearwardly from the draft element and passes over a transverse circular bar 6 adjacent the longitudinal side beams 7 of the shock-receiving frame.

Figure 5:
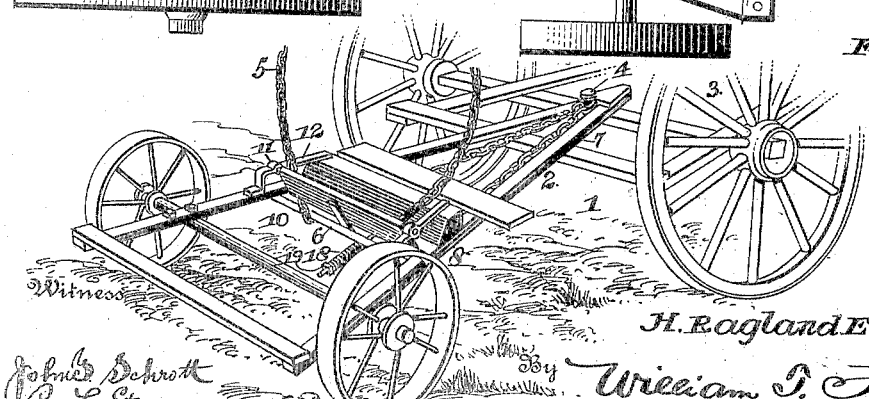
Fig. 5 is a perspective view showing a modification of the chain securing means.

As will be presently set forth, one of the salient features of my invention is the provision of a shock handling apparatus in which the tension of the shock securing or lashing device is increased commensurate with the draft of the vehicle. Under some circumstances I have found it desirable to provide means for positively locking the lashing device immediately subsequent to the positioning of the shock in a horizontal plane with respect to the running gear. A very reliable and efficient means in this connection is illustrated in Figs. 5 and 6 of the drawings, and embodies the following construction and arrangement:—Disposed transversely of the longitudinal beams 7 of the shock-receiving frame 2 is a beam 8, having on its rear side an inclined stationary member or jaw 9. Oppositely arranged relatively to this member is a similar member or jaw 10, which is pivoted at its opposite ends, as at 11, to the upstanding brackets 12 located directly above the longitudinal beams 7. Both of these members 9 and 10 are provided upon their confronting faces with thin metallic plates 13. Arranged medially of the movable member 10 and depending therefrom in the same plane is an extension 14 having at its outer terminal an eye 15 for the reception of a rod 16 which is connected rigidly at one end to a small bracket 17. The outer free end of the rod 16 has mounted thereon a retractile coiled spring 18 held by the nut 19, and by virtue of this construction a yieldable tension is brought to bear on the chain 5, and thereby locks it in a manner which will be hereinafter more fully explained.

In practice, the vehicle, as an entirety, is first drawn to a point in the field in proximity to a shock. The shock-receiving frame is then disconnected from the draft element and caused to assume a vertical position similar to that exhibited in Figs. 1 and 2 of the drawings. The chain 5 having been previously disconnected at a suitable point in its length is then encircled about the shock and properly connected with the pin 4, as shown in Fig. 2. Upon giving the proper signal the team moves forwardly, and simultaneously the shock-receiving frame 2 with the shock imposed thereon is rocked until the front end of said frame passes over the pin 4 of the draft element, while the slack which existed in the chain previous to the coupling of the two sections of the running gear, is automatically compensated for, and the said chain drawn tightly about the shock. The pull between the two sections of the vehicle is communicated by the chain 5, and it will appear manifest that as long as the vehicle progresses the shock will be held firmly and compactly thereon.

When contingencies arise which might be calculated to interfere with normal operation of the invention, as just described, and more especially in connection with the automatic tensioning means for the chain, I can resort to the positive locking arrangement hereinbefore described with regard to Figs. 5 and 6 of the drawings. When making use of this appurtenance, it will be seen that as soon as the shock-receiving frame and its shock are rocked to a horizontal position, the members 9 and 10 with their metallic lined faces 13 will automatically bite or engage and lock the chain against retrograde movement.

Whether or not the positive locking means is employed in connection with the chain, the vehicle with its load is driven to its destination, and here the chain is unfastened, and the frame lifted to permit the shock to slide therefrom. In this connection, I do not deem it amiss to state that if extreme care is exercised the shock may be set up again in practically the same position and formation as it occupied originally.

The obvious advantages of my invention are that a shock may be transported from one point to another without the necessity or requirement of but exceedingly little manual coöperation. The present day custom of farmers is to shuck corn in the field. This is usually done late in the fall when the ground is damp and disagreeable to stand upon. By using my invention one person can haul the shocks to the barn and thus be enabled to shuck it in a dry place. A further advantage resides in the fact that my device transfers the shock from the ground and leaves very little of the shock remaining on the ground, the opposite almost invariably occurring when this operation is done by hand. Other features which I deem important are that it does not necessarily require a skilful or intelligent person to operate my invention; and a saving of considerable time is effected in transferring the shocks from the field to any given point.

What I claim is:

1. In a shock-handling device, the combination of a vehicle running gear comprising two wheeled sections, a shock-receiving frame and a draft element, said sections adapted to be entirely separated in the loading operation and a flexible connection between the frame and the element adapted to be automatically tightened about the shock commensurate with the draft of the vehicle.

2. In a shock-handling device, the combination of a vehicle running gear comprising a shock-receiving frame and a draft element, a flexible connection between the frame and an element adapted to be automatically tightened about the shock commensurate with the draft of the vehicle, and means for locking said connection when tightened, said means comprising a stationary jaw and a spring-controlled pivoted jaw and said jaws having opposed edges for simultaneously engaging said connection.

3. A shock handling device comprising a pair of wheeled sections, a shock receiving frame and a draft element, said frame in the operation of loading adapted to be placed in a substantially vertical position and entirely separated from the draft element, and a flexible connection designed to be lashed about the shock with its ends connected to the draft element, said frame designed to be rocked from its substantially vertical position to a position on top of said element and the connection tightened about the shock by a draft of said element.

4. A shock handling device comprising a pair of wheeled sections, a shock receiving frame and a draft element, said frame in the operation of loading adapted to be placed in a substantially vertical position and entirely separated from the draft element, and a flexible connection designed to be lashed about the shock with its ends connected to the draft element, said frame designed to be rocked from its substantially vertical position to a position on top of said element and the connection simultaneously tightened about the shock by a draft of said element.

5. A shock handling device comprising a pair of wheeled sections, a shock receiving frame and a draft element, said frame in the operation of loading adapted to be placed in substantially vertical position and entirely separated from the draft element, and a flexible connection designed to be lashed about the shock with its ends connected to the draft element, said frame designed to be rocked from its substantially vertical position so that the forward portion thereof will rest on top of said element and the connection tightened about the shock, by a draft of said element.

6. A shock handling device comprising a pair of wheeled sections, a shock receiving frame and a draft element having a projection, said frame in the operation of loading adapted to be placed in an upright position and entirely removed from the draft element, and a flexible connection designed to be lashed about the shock with its ends connected to said projection, said frame, upon a draft of said element, adapted to be rocked from its upright position to a position on top of said element and straddling said projection, and simultaneously tightening the connection about the shock.

7. In a shock handling device, a pair of wheeled sections, comprising a shock receiving frame and a draft element, the frame adapted to be removed from the element in the operation of loading, a projection on said element, a flexible connection between the frame and the projection adapted to be tightened about the shock commensurate with tht draft of said element, said projection also preventing lateral thrust of said frame with respect to the element.

In testimony whereof, I hereunto affix my signature, in the presence of two witnesses.

H. RAGLAND EUBANK.

Witnesses:
S. A. SWEET,
I. D. BLAKE.